(12) United States Patent
Hwang et al.

(10) Patent No.: US 10,297,810 B2
(45) Date of Patent: May 21, 2019

(54) BATTERY COMPRISING A CAP PLATE HAVING A COUPLING PIN

(71) Applicant: SAMSUNG SDI CO., LTD., Yongin-si, Gyeonggi-do (KR)

(72) Inventors: San Hwang, Yongin-si (KR); Jangho Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 312 days.

(21) Appl. No.: 14/826,165

(22) Filed: Aug. 13, 2015

(65) Prior Publication Data
US 2016/0049634 A1    Feb. 18, 2016

(30) Foreign Application Priority Data

Aug. 14, 2014   (KR) ................... 10-2014-0106231
Aug. 14, 2014   (KR) ................... 10-2014-0106232
Apr. 6, 2015    (KR) ................... 10-2015-0048323

(51) Int. Cl.
| | | |
|---|---|---|
| H01M 2/26 | (2006.01) |
| H01M 2/30 | (2006.01) |
| H01M 2/22 | (2006.01) |
| H01M 2/14 | (2006.01) |
| H01M 2/04 | (2006.01) |

(52) U.S. Cl.
CPC ............. *H01M 2/263* (2013.01); *H01M 2/14* (2013.01); *H01M 2/22* (2013.01); *H01M 2/26* (2013.01); *H01M 2/30* (2013.01); *H01M 2/0426* (2013.01); *H01M 2/0469* (2013.01); *H01M 2/0473* (2013.01); *H01M 2/266* (2013.01)

(58) Field of Classification Search
None
See application file for complete search history.

(56) References Cited

U.S. PATENT DOCUMENTS

| | | |
|---|---|---|
| 2003/0111512 A1 | 6/2003 | O'Connell et al. |
| 2006/0141355 A1 | 6/2006 | Kang |
| 2007/0105015 A1* | 5/2007 | Munenaga .......... H01M 2/0404 429/161 |
| 2007/0160904 A1 | 7/2007 | Uh |

(Continued)

FOREIGN PATENT DOCUMENTS

| | | |
|---|---|---|
| EP | 1 659 651 A1 | 5/2006 |
| EP | 2 154 738 A1 | 2/2010 |

(Continued)

OTHER PUBLICATIONS

KIPO Office Action dated Aug. 22, 2016, corresponding to Korean Patent Application No. 10-2015-0048323 (9 pages).
EPO Search Report dated May 12, 2016, for corresponding European Patent application 15180603.1, (12 pages).
EPO Search Report dated May 12, 2016, for corresponding European Patent application 15180599.1, (11 pages).

(Continued)

*Primary Examiner* — Tracy M Dove
(74) *Attorney, Agent, or Firm* — Lewis Roca Rothgerber Christie LLP

(57) ABSTRACT

A battery includes an electrode assembly, a cap plate comprising an electrode terminal, and an electrode lead coupled to the cap plate, wherein the electrode lead electrically connects the electrode assembly and the electrode terminal and the cap plate and the electrode lead are coupled at the center of the electrode lead, which may reduce an electric resistance of a charge/discharge path and improve output performance of the battery.

18 Claims, 11 Drawing Sheets

(56) References Cited

U.S. PATENT DOCUMENTS

| | | |
|---|---|---|
| 2007/0196732 A1 | 8/2007 | Tatebayashi et al. |
| 2007/0232123 A1 | 10/2007 | Uh |
| 2009/0155632 A1 | 6/2009 | Byun et al. |
| 2010/0035132 A1 | 2/2010 | Park |
| 2011/0244318 A1 | 10/2011 | Cho et al. |
| 2011/0287291 A1* | 11/2011 | Byun .................. H01M 2/0426 429/94 |
| 2011/0287302 A1 | 11/2011 | Kim |
| 2012/0219849 A1 | 8/2012 | Kim |
| 2012/0308855 A1 | 12/2012 | Shimizu et al. |
| 2013/0202932 A1 | 8/2013 | Song et al. |

FOREIGN PATENT DOCUMENTS

| | | |
|---|---|---|
| EP | 2 498 318 A1 | 9/2012 |
| EP | 2 506 358 A1 | 10/2012 |
| EP | 2 538 467 A1 | 12/2012 |
| EP | 2 597 703 A1 | 5/2013 |
| JP | 11-25993 A | 1/1999 |
| JP | 11-26008 A | 1/1999 |
| JP | 3332783 B2 | 10/2002 |
| JP | 2006-108018 A | 4/2006 |
| JP | 2011-70918 A | 4/2011 |
| JP | 2013-175516 A | 9/2013 |
| JP | 5481527 B2 | 4/2014 |
| JP | 2015-041615 A | 3/2015 |
| KR | 10-2006-0059703 A | 6/2006 |
| KR | 10-2007-0107921 | 11/2007 |
| KR | 10-2008-0035400 A | 4/2008 |
| KR | 10-2011-0111700 A | 10/2011 |
| KR | 10-2011-0127830 A | 11/2011 |
| KR | 10-2012-0097973 A | 9/2012 |
| KR | 10-2012-0108045 | 10/2012 |
| KR | 10-2013-0090190 A | 8/2013 |
| WO | WO 2013/125153 A1 | 8/2013 |

OTHER PUBLICATIONS

EPO Search Report dated May 12, 2016, for corresponding European Patent application 15180600.7, (13 pages).

EPO Search Report dated Jan. 25, 2016, for corresponding European Patent application 15180603.1, (7 pages).

EPO Search Report dated Jan. 22, 2016, corresponding to European Patent application 15180599.1, (7 pages).

EPO Search Report dated Jan. 21, 2016, corresponding to European Patent application 15180600.7, (7 pages).

Patent Abstracts of Japan and Machine English Translation of JP 11-25993 A, Jan. 29, 1999, 20 Pages.

Patent Abstracts of Japan and Machine English Translation of JP 11-26008 A, Jan. 29, 1999, 14 Pages.

Patent Abstracts of Japan and Machine English Translation of JP 10-241741, Corresponding to JP 3332783 B2, Oct. 7, 2002, 15 Pages.

Machine English Translation of JP 2006-108018 A, Apr. 20, 2006, 31 Pages.

Patent Abstracts of Japan and Machine English Translation of JP 2011-70918 A, Apr. 7, 2011, 30 Pages.

Machine English Translation of JP 5481527 B2, Apr. 23, 2014, 45 Pages.

U.S. Office Action dated Sep. 21, 2017, issued in U.S. Appl. No. 14/826,160 (8 pages).

U.S. Final Office Action dated Jan. 26, 2018, issued in U.S. Appl. No. 14/826,160 (6 pages).

U.S. Final Office Action dated Aug. 28, 2018, issued in U.S. Appl. No. 14/826,169 (12 pages).

EPO Office Action dated May 8, 2018, corresponding to European Patent Application No. 15180599.1 (5 pages).

U.S. Office Action dated Jan. 4, 2019, issued in U.S. Appl. No. 14/826,169 (12 pages).

* cited by examiner

BATTERY COMPRISING A CAP PLATE HAVING A COUPLING PIN

CROSS-REFERENCE TO RELATED APPLICATION

This application claims priority to and the benefit of Korean Patent Application No. 10-2014-0106231, filed on Aug. 14, 2014, Korean Patent Application No. 10-2014-0106232, filed on Aug. 14, 2014, Korean Patent Application No. 10-2015-0048323, filed on Apr. 6, 2015, in the Korean Intellectual Property Office, the entire contents of which are incorporated herein by reference.

BACKGROUND

1. Field

One or more embodiments of the present invention relate to a battery.

2. Description of the Related Art

Unlike primary batteries that are generally not rechargeable, secondary batteries are dischargeable and rechargeable. Secondary batteries are often used as energy sources for mobile devices, such as mobile phones and laptops. Recently, much research has been conducted to use the secondary batteries in electric automobiles and hybrid automobiles as an alternative energy source that can replace fossil fuels.

SUMMARY

One or more embodiments of the present invention are directed toward a battery with a reduced electric resistance of a charge/discharge path and an improved output performance.

Additional aspects of embodiments will be set forth in part in the description which follows and, in part, will be apparent from the description, or may be learned by practice of the presented embodiments.

According to one or more embodiments of the present invention, a battery includes an electrode assembly; a cap plate comprising an electrode terminal; and an electrode lead coupled to the cap plate. The electrode lead electrically connects the electrode assembly and the electrode terminal. The cap plate and the electrode lead are coupled at the center of the electrode lead.

The cap plate may include a coupling pin that protrudes via the electrode lead, and an end of the coupling pin, which is exposed through the electrode lead, may be riveted or spun, and thus pressed onto the electrode lead.

The electrode lead may include a first part that faces and is coupled to the cap plate; and a second part that bends relative to the first part and is coupled to an electrode tab that projects from the electrode assembly.

An avoidance space may be formed in the second part of the electrode lead.

The second part of the electrode lead may be divided into two parts by the avoidance space.

The second part of the electrode lead may include a plate in which the avoidance space is punched as a hole.

The second part of the electrode lead may include a first layer and a second layer, and the electrode tab may be between the first and second layers.

The second part of the electrode lead may include a first layer and a second layer, and the electrode tab may be on (or formed on) the first and second layers.

The second part of the electrode lead may include a first layer and a second layer, wherein the first layer may be divided into two parts to provide an avoidance space, the second layer may include a whole plate, and the second layer may cover a portion of the avoidance space of the first part.

The second part of the electrode lead may include a first layer and a second layer, and the first and second layers may be divided into two parts, respectively to provide an avoidance space.

The first part of the electrode lead may include a first layer and a second layer.

The electrode lead may partially or entirely include two layers.

The cap plate may include a coupling pin that protrudes via the electrode lead. A lower end of the coupling pin, which is exposed through the electrode lead, may be riveted or spun, and thus pressed onto the electrode lead. An extended portion of the lower end of the coupling pin may partially overlap the electrode lead.

The electrode lead may include a first part coupled to the cap plate, and a second part that extends downward from the first part to the electrode assembly. The second part of the electrode lead may partially overlap the extended portion of the lower end of the coupling pin.

The electrode lead may include a first part coupled to the cap plate, a second part that extends downward from the first part to the electrode assembly, and folded portions that connect the first and second parts such that the first and second parts are bent with respect to each other. The first part may expand between two folded portions that are spaced apart.

A coupling pin, which protrudes via the electrode lead, may be coupled to an expanded portion of the first part.

BRIEF DESCRIPTION OF THE DRAWINGS

These and/or other aspects will become apparent and more readily appreciated from the following description of embodiments of the present invention, taken in conjunction with the accompanying drawings in which.

DETAILED DESCRIPTION

Batteries according to embodiments of the present invention are described with reference to the accompanying drawings. Expressions such as "at least one of," when preceding a list of elements, modify the entire list of elements and do not modify the individual elements of the list.

It will be understood that when an element or layer is referred to as being "on", "coupled to" or "connected to" another element or layer, it may be directly on or connected to the other element or layer or intervening elements or layers may also be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

It will be understood that although the terms "first", "second", etc. may be used herein to describe various elements, these elements should not be limited by these terms. These elements are only used to distinguish one element from another.

It will be further understood that the terms "comprises" and/or "comprising" used herein specify the presence of stated features or components, but do not preclude the presence or addition of one or more other features or components.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
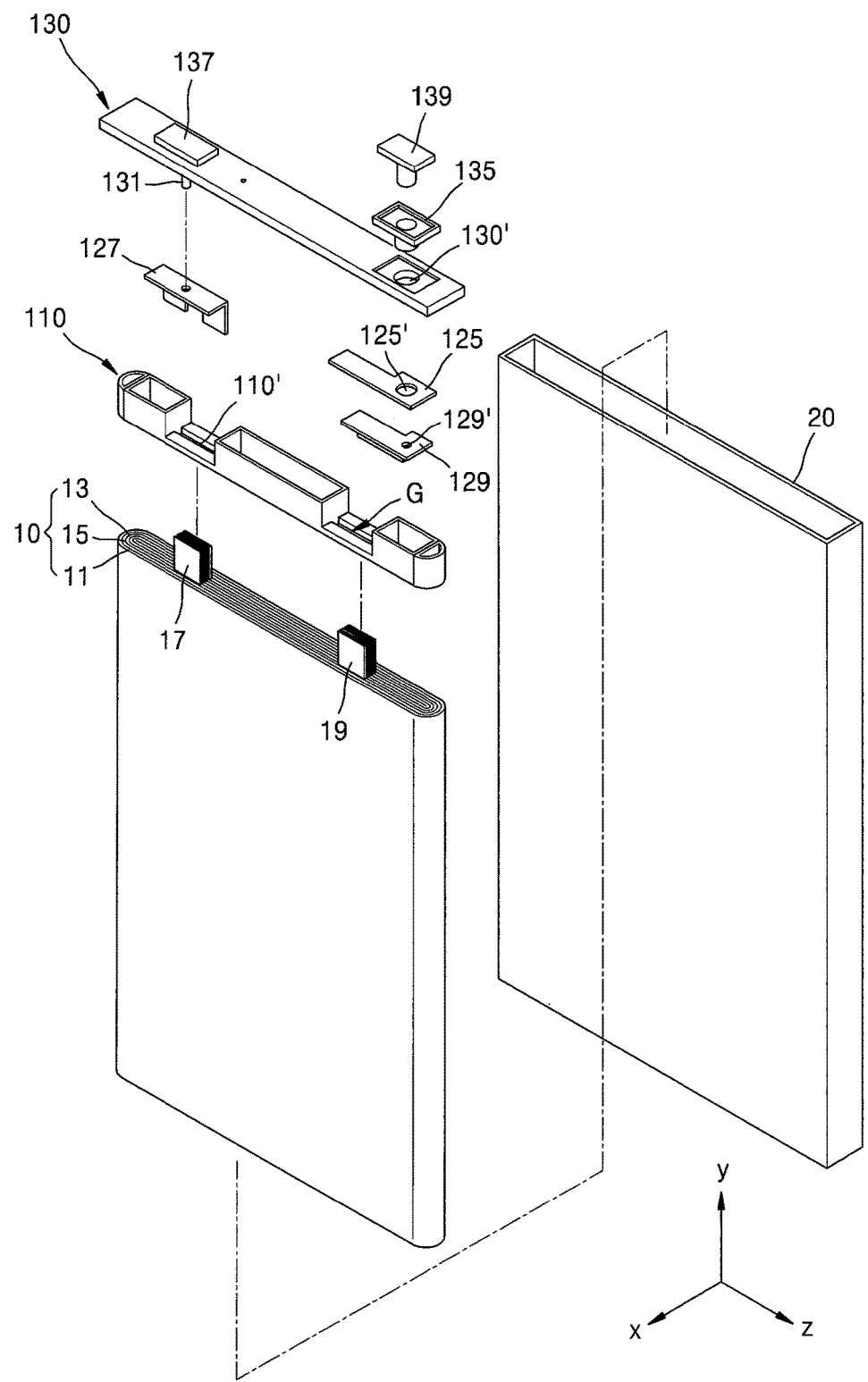
FIG. 1 is an exploded perspective view of a battery according to embodiments of the present invention.

FIG. 1 is an exploded perspective view of a battery according to embodiments of the present invention.

Referring to FIG. 1, the battery includes an electrode assembly 10, an insulating spacer 110 disposed on the electrode assembly 10, a case 20 that accommodates the electrode assembly 10 and the insulating spacer 110, and a cap plate 130 that covers an upper portion of the case 20.

The electrode assembly 10 is a rechargeable secondary battery and may be a lithium-ion battery. The electrode assembly 10 may include a positive electrode plate 11, a negative electrode plate 13, and a separator 15. The electrode assembly 10 may be sealed inside the case 20 with an electrolyte.

For example, the electrode assembly 10 may be formed by winding a stack of the positive electrode plate 11, the negative electrode plate 13, and the separator 15 in the form of a jelly roll. The positive electrode plate 11 may be formed by coating a positive active material on at least one surface of a positive collector. Similarly, the negative electrode plate 13 may be formed by coating a negative active material on at least one surface of a negative collector.

For example, according to embodiments of the present invention, the positive electrode plate 11 may be placed at an outermost side of the electrode assembly 10. Placing the positive electrode assembly (that emits a relatively large amount of heat) at an outer side near the case 20 accelerates heat emission through the case 20. For example, the positive electrode assembly may directly or thermally contact the case 20. Herein, the term "thermally contact" indicates that two elements do not necessarily directly contact one another, but that there is thermal interaction between the elements.

The electrode assembly 10 may be accommodated in the case 20 with an electrolyte through an upper opening of the case 20. The upper opening of the case 20 may be sealed by the cap plate 130. A portion where the cap plate 130 contacts the case 20 may be welded by a laser and thus air-tightly sealed.

A positive electrode tab 17 and a negative electrode tab 19 may be connected to at least one portion of the positive electrode plate 11 and the negative electrode plate 13, respectively. Herein, the positive and negative electrode tabs 17 and 19 may be referred to as "electrode tabs 17 and 19." A high-capacity, high-output battery may include a plurality of positive electrode tabs 17 and a plurality of negative electrode tabs 19 that project from the electrode assembly 10. The plurality of positive electrode tabs and negative electrode tabs may provide high-current electric output and reduce resistance loss.

The positive electrode tab 17 may be connected to the cap plate 130, and the negative electrode tab 19 may be connected to a negative electrode terminal 139 that projects from an upper surface of the cap plate 130. For example, a positive electrode terminal 137 and the negative electrode terminal 139 may be exposed through the upper surface of the cap plate 130. The positive electrode terminal 137 may be formed as a portion of the cap plate 130 that integrally protrudes from the cap plate 130 or as an additional element that is coupled to the cap plate 130. The positive electrode terminal 137 may have a positive polarity that is the same as the cap plate 130. However, this does not imply that the positive electrode terminal 137 is clearly distinguishable from the cap plate 130. For example, the positive electrode terminal 137 may be the cap plate 130. As another example, a battery with low capacitance may not include an additional terminal and the positive electrode terminal 137 may refer to the cap plate 130.

The negative electrode terminal 139 may be formed of an additional element that is assembled by penetrating through the cap plate 130. The negative electrode terminal 139 may be insulatingly coupled to the cap plate 130 and may protrude from the upper surface of the cap plate 130. Herein, the positive electrode terminal 137 and the negative electrode terminal 139 may be referred to as "electrode terminals 137 and 139."

The positive and negative electrode tabs 17 and 19 may form single packs that are inserted into tab holes 110' of the insulating spacer 110 and penetrate through an upper portion of the insulating spacer 110. Upper ends of the positive and negative electrode tabs 17 and 19 that penetrate through the insulating spacer 110 may be respectively connected to a positive electrode lead 127 and a negative electrode lead 129.

Before the positive electrode tab 17 is inserted into the insulating spacer 110, the plurality of positive electrode tabs 17 may be formed in a single pack by temporary welding. The plurality of positive electrode tabs 17 formed in a single pack by temporary welding may be easily inserted into the tab hole 110'. Similarly, before the negative electrode tab 19 is inserted into the insulating spacer 110, the plurality of negative electrode tabs 19 may be formed in a single pack by temporary welding.

The positive electrode tab 17 extends through the upper portion of the insulating spacer 110 by penetrating through the tab hole 110' of the insulating spacer 110, and the upper end of the positive electrode tab 17 is connected to the positive electrode lead 127. The positive electrode lead 127 is also connected to the cap plate 130. Accordingly, the positive electrode tab 17 of the electrode assembly 10 is electrically connected with the cap plate 130 via the positive electrode lead 127. The entire cap plate 130 may have a positive polarity that is the same as the positive electrode tab 17, and a portion of the cap plate 130 may form the positive electrode terminal 137.

Figure 2:
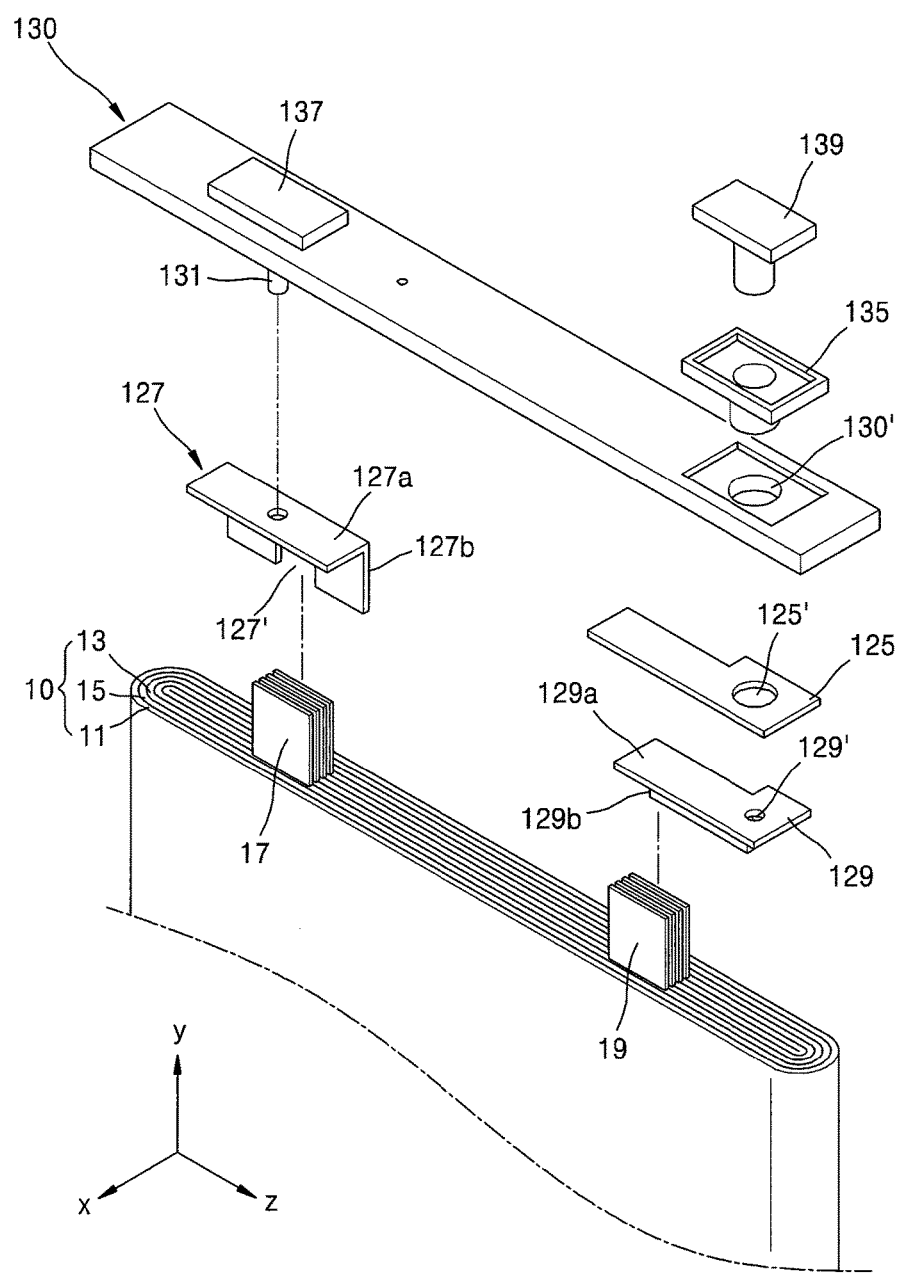
FIG. 2 is an exploded perspective view of a portion of the battery of FIG. 1.

FIG. 2 is an exploded perspective view of a portion of the battery of FIG. 1. Referring to FIG. 2, the positive electrode lead 127 may be bent in an 'L' shape. For example, the positive electrode lead 127 may be bent and extend in two different directions. A first part 127a of the positive electrode lead 127 may be oriented to face the cap plate 130 and be coupled to the cap plate 130. Also, a second part 127b of the positive electrode lead 127, which extends in a different direction from the first part 127a, may be oriented to face the positive electrode tab 17 and be coupled to the positive electrode tab 17. Therefore, in order to be coupled to the positive electrode tab 17 and the cap plate 130, the positive electrode lead 127 may be bent in different directions such that the first part 127a faces and is coupled to the cap plate 130 and the second part 127b faces and is coupled to the positive electrode tab 17.

The second part 127b of the positive electrode lead 127 may be divided. For example, the second part 127b of the positive electrode lead 127 may include an avoidance space 127' to avoid mechanical interference between the second part 127b and a coupling pin 131. When an end of the coupling pin 131 is riveted or spun during coupling of the cap plate 130 and the positive electrode lead 127, the avoidance space 127' provides extra space to accommodate an end of the coupling pin 131 that may expand when pressed with a manufacturing tool. For example, an end of the coupling pin 131 includes an expanding head unit that is pressed onto a coupling surface and expands, and the head unit of the coupling pin 131 may be accommodated in the avoidance space 127'.

In some embodiments, the positive electrode lead 127 may include the first part 127a shaped like a plate, the second part 127b divided into two parts with the avoidance space 127' in between, and the first and second parts 127a and 127b may be bent with respect to each other.

According to other embodiments of the present invention, the positive electrode lead 127 may omit the avoidance space 127'. For example, if the coupling pin 131 is relatively large, i.e., if the coupling pin 131 has a large diameter, the positive electrode lead 127 may have the avoidance space 127'. Alternatively, if the coupling pin 131 is relatively small, i.e., if the coupling pin 131 has a small diameter, the avoidance space 127' may be omitted in the positive electrode lead 127. The avoidance space 127', which divides the second part 127b of the positive electrode lead 127, may cause a decrease in mechanical strength between the cap plate 130 and the positive electrode lead 127. Thus, the size of the coupling pin 131 may vary according to the mechanical strength that is required between the cap plate 130 and the positive electrode lead 127.

Figure 3:
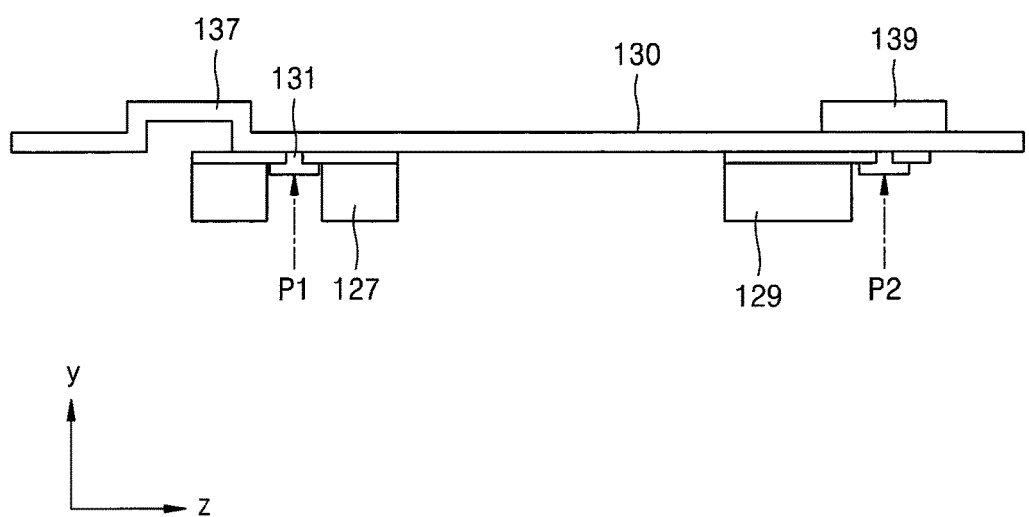
FIG. 3 is a side view of a coupling structure between elements illustrated in FIG. 2.

FIG. 3 is a side view of a coupling structure between elements illustrated in FIG. 2.

Referring to FIG. 3, the positive electrode lead 127 may be coupled to the cap plate 130 via the coupling pin 131 that protrudes from the cap plate 130. For example, the coupling pin 131 that protrudes from the lower surface of the cap plate 130 may penetrate through the positive electrode lead 127, and a lower end of the coupling pin 131 that is exposed through a lower surface of the positive electrode lead 127 may be pressed onto the lower surface of the positive electrode lead 127 by riveting or spinning (at a coupling position P1). For example, during riveting, the lower end of the coupling pin 131 (that is exposed through the lower surface of the positive electrode lead 127) is hit with a hammer so that the lower end of the coupling pin 131 is pressed onto the lower surface of the positive electrode lead 127. During spinning, pressure is applied to the lower end of the coupling pin 131 (that is exposed through the lower surface of the positive electrode lead 127) with a quickly rotating manufacturing tool so that the lower end of the coupling pin 131 is pressed onto the lower surface of the positive electrode lead 127. In other embodiments, the positive electrode lead 127 and the cap plate 130 may be welded to each other. The coupling structure between the negative electrode lead 129 and the cap plate 130 are described below.

Referring to FIGS. 1 and 2, the negative electrode tab 19 penetrates through the tab hole 110' of the insulating spacer 110 and is exposed through the upper portion of the insulating spacer 110, and an exposed upper end of the negative electrode tab 19 is connected to the negative electrode lead 129. The negative electrode lead 129 is then coupled to the negative electrode terminal 139. Accordingly, the negative electrode tab 19 of the electrode assembly 10 is electrically connected to the negative electrode terminal 139 via the negative electrode lead 129. As a reference, the positive and negative electrode leads 127 and 129 may be referred to as "electrode leads 127 and 129" herein.

The negative electrode lead 129 may be entirely bent in an 'L' shape. In other words, a first part 129a of the negative electrode lead 129 may face the cap plate 130 and be coupled to the cap plate 130. Also, a second part 129b of the negative electrode lead 129, which extends in a different direction from the first part 129a, may face the negative electrode tab 19 and be coupled to the negative electrode tab 19. In order to be coupled to the cap plate 130 and the negative electrode tab 19, the negative electrode lead 129 may be bent in different directions such that the first part 129a faces and is coupled to the cap plate 130 and the second part 127b faces and is coupled to the negative electrode tab 19.

However, the embodiments of the present invention are not limited thereto, and for example, the negative electrode lead 129 may be shaped in the form of a flat plate.

The negative electrode terminal 139 is assembled in the cap plate 130 with a gasket 135 between the negative electrode terminal 139 and the cap plate 130. The cap plate 130 includes a terminal hole 130' through which the negative electrode terminal 139 passes. The negative electrode terminal 139 is inserted into the terminal hole 130' of the cap plate 130 with the gasket 135 in between such that the negative electrode terminal 139 may be electrically insulated from the cap plate 130. The gasket 135 may seal a surrounding area of the terminal hole 130' so that the electrolytes accommodated in the case 20 do not leak and external impurities are blocked.

An insulating plate 125 may be provided between the negative electrode lead 129 and the cap plate 130 to electrically insulate the negative electrode lead 129 and the cap plate 130. The negative electrode lead 129 and the insulating plate 125 may respectively include terminal holes 125' and 129' through which the negative electrode terminal 139 passes.

The negative electrode terminal 139 passes through the terminal holes 125', 129', and 130' of the insulating plate 125, the negative electrode lead 129, and the cap plate 130, respectively. When a lower portion of the negative electrode terminal 139 is pressed onto a lower surface of the negative electrode lead 129, the cap plate 130, the insulating plate 125, and the negative electrode lead 129 may be aligned and integrally coupled to one another.

For example, the negative electrode terminal 139 may be pressed onto the lower surface of the negative electrode lead 129 by stacking the cap plate 130, the negative electrode lead 129, and the insulating plate 125 on one another, inserting the negative electrode terminal 139 into the terminal holes 125', 129', and 130' from an upper portion of the cap plate 130, and riveting or spinning the lower portion of the negative electrode terminal 139, which is exposed through the lower surface of the negative electrode lead 129.

Referring to FIG. 3, although the lower portion of the negative electrode terminal 139 is pressed onto the lower surface of the negative electrode lead 129, the lower portion of the negative electrode terminal 139 may also be welded so that the negative electrode terminal 139 is more stably attached to the negative electrode lead 129 (at a coupling position P2). This is generally more stable because coupling the negative electrode terminal 139 and the negative electrode lead 129 forms a charge/discharge path on a negative electrode side. An upper portion of the negative electrode terminal 139 may include a plate protruding from a cylindrical body and may be pressed onto the upper surface of the cap plate 130.

Referring to FIG. 1, similar to the insulating plate 125 between the cap plate 130 and the negative electrode lead 129, an additional insulating plate may be between the cap plate 130 and the positive electrode lead 127. The additional insulating plate may be inserted to maintain a distance between the cap plate 130 and the positive electrode lead 127 that is substantially the same as a distance between the cap plate 130 and the negative electrode lead 129. Also, the additional insulating plate may be between the cap plate 130 and the positive electrode lead 127 to increase a coupling strength generated when pressed by the coupling pin 131.

The insulating spacer 110 is disposed between the electrode assembly 10 and the cap plate 130. The insulating spacer 110 is formed of an insulating material to prevent electrical interference or a short circuit between the electrode assembly 10 and the cap plate 130. For example, the insulating spacer 110 may be disposed between the electrode assembly 10 and the electrode leads 127 and 129. Also, the insulating spacer 110 collects the plurality of electrode tabs 17 and 19 of the electrode assembly 10 so that electrical connection of the electrode leads 127 and 129 is easily conducted.

For example, the plurality of positive and negative electrode tabs 17 and 19 that protrude upward from the electrode assembly 10 may be respectively collected as a pack as they penetrate through the tab hole 110' of the insulating spacer 110. The respective packs of the positive and negative electrode tabs 17 and 19 may be electrically connected to the positive and negative electrode leads 127 and 129 by welding.

The insulating spacer 110 may secure an appropriate amount of space between the electrode assembly 10 and the cap plate 130 so that the electrode tabs 17 and 19 are insulated even when subjected to external shock from falling or other causes.

The insulating spacer 110 may include a welding groove G to weld the electrode tabs 17 and 19 and the electrode leads 127 and 129. For example, the welding groove G may be formed on the tab hole 110' of the electrode tabs 17 and 19. The welding groove G may allow the positive and negative electrode tabs 17 and 19, which pass through the tab hole 110', to be exposed through the insulating spacer 110, and to be welded with the positive and negative electrode leads 127 and 129, respectively. For example, in some embodiments, the electrode tabs 17 and 19 and the electrode leads 127 and 129 may be welded by ultrasonic welding.

According to embodiments of the present invention, the positive electrode lead 127 and the cap plate 130 may be coupled to each other by using the coupling pin 131 that protrudes from the cap plate 130. For example, the coupling pin 131 that protrudes from the cap plate 130 may penetrate through the positive electrode lead 127, and the lower end of the coupling pin 131, which is exposed through the lower surface of the positive electrode lead 127, may be pressed onto the lower surface of the positive electrode lead 127 by using a hammer or a quickly rotating manufacturing tool. However, it will be appreciated by one skilled in the art that according to embodiments of the present invention, the cap plate 130 and the positive electrode lead 127 may be coupled according to different methods. For example, the coupling pin 131 which couples the cap plate 130 and the positive electrode lead 127 may be formed on the cap plate 130 or on the positive electrode lead 127. Also, for example, the cap plate 130 and the positive electrode lead 127 may be coupled to each other by welding.

The coupling of the positive electrode lead 127 and cap plate 130 may form a charge/discharge path between the electrode assembly 10 and the positive electrode terminal 137. In other words, the contact and coupling of the positive electrode lead 127 and the cap plate 130 may affect electric resistance of the charge/discharge path.

Figure 4:
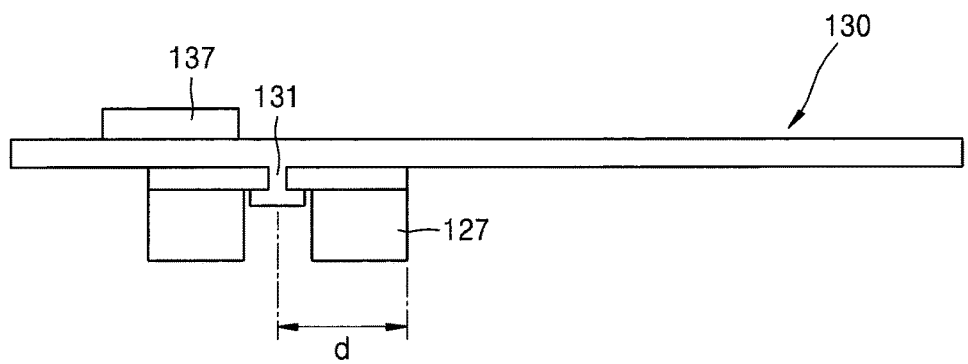
FIG. 4 is a side view of a coupling structure between a positive electrode lead and a cap plate of the battery of FIG. 1.

FIG. 4 is a side view of a portion of the battery of FIG. 1, i.e., a coupling structure between the positive electrode lead 127 and the cap plate 130. Referring to FIG. 4, the positive electrode lead 127 and the cap plate 130 are coupled to each other at the center of the positive electrode 127, also referred to as a coupling location. In FIG. 4, the coupling location is at a distance d from an end of the positive electrode lead 127.

The coupling strength of the positive electrode lead 127 and the cap plate 130, i.e., how much the positive electrode lead 127 and the cap plate 130 are firmly coupled to each other, is closely related to the electric resistance of the entire charge/discharge path of the battery which crosses the positive electrode lead 127 and the cap plate 130.

For example, if the positive electrode lead 127, which is electrically connected to the electrode assembly 10, firmly and without any gaps contacts the surface of the cap plate 130, which is electrically connected to an external device, the electric resistance of the charge/discharge path may be reduced. In some embodiments, the positive electrode lead 127 firmly and without any gaps contacts the positive electrode terminal 137 of the cap plate 130. However, if there is a gap or tiny gaps partially formed between the positive electrode lead 127 and the cap plate 130, or if the positive electrode lead 127 unevenly contacts the cap plate 130, a portion of a contact surface between the positive electrode lead 127 and the cap plate 130 is unable to form an electric path, thereby increasing the electric resistance of the charge/discharge path.

According to embodiments of the present invention, the positive electrode lead 127 and the cap plate 130 are coupled at the center of the positive electrode lead 127 so that the adhesive strength may be uniform over a coupling surface of the positive electrode lead 127, and gaps may not be formed between the positive electrode lead 127 and the cap plate 130.

According to embodiments of the present invention, the positive electrode lead 127 and the cap plate 130 may be coupled in the center of the positive electrode lead 127 such that the coupling location is formed in the center along a longitudinal direction of the positive electrode lead 127. For example, the coupling location is set in the center of the positive electrode lead 127 in the longest dimension of the positive electrode lead 127 so that the coupling strength is uniform over a larger area.

However, the scope of the present invention is not limited to the description above. For example, according to other embodiments of the present invention, the center of the positive electrode lead 127 may indicate the center along any direction of the positive electrode lead 127. For example, when the coupling location is set at the center along any direction of the positive electrode lead 127, the adhesive strength between the positive electrode lead 127 and the cap plate 130 may be uniform.

According to embodiments of the present invention, the coupling location of the positive electrode lead 127 and the cap plate 130 may be an assembled location of the coupling pin 131 that couples the positive electrode lead 127 and the cap plate 130. According to other embodiments of the present invention, the positive electrode lead 127 and the cap plate 130 may be coupled to each other by welding. For example, the coupling location of the positive electrode lead 127 and the cap plate 130 may be a welded area therebetween (e.g., a location of a welding point).

Figure 5:
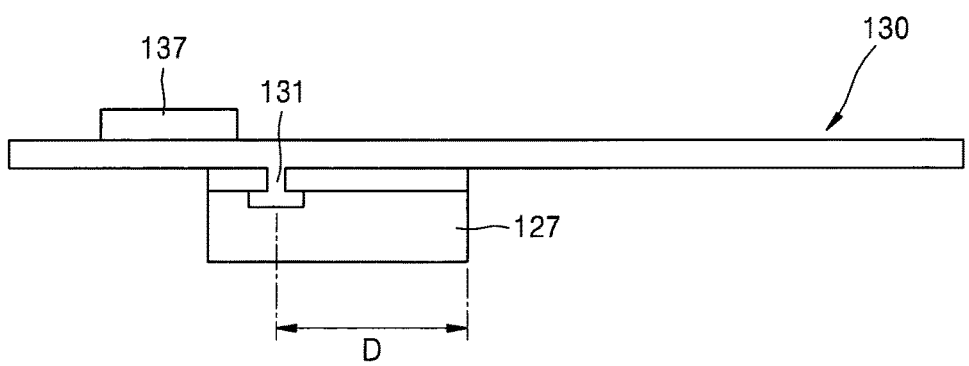
FIG. 5 is a side view of a coupling structure between a positive electrode lead and a cap plate according to a comparative example.

FIG. 5 is a diagram of a coupling structure between the positive electrode lead 127 and the cap plate 130 according to a comparative example. Referring to FIG. 5, the positive electrode lead 127 and the cap plate 130 may be coupled to each other by the coupling pin 131. In some embodiments, the positive electrode lead 127 and the cap plate 130 may be coupled at a location offset from the center of the positive electrode lead 127, i.e., the coupling location of the positive electrode lead 127 and the cap plate 130 may be biased toward the left or right side of the positive electrode lead 127. In FIG. 5, the coupling location is at a distance D from an end of the positive electrode lead 127

For example, if the coupling location is biased toward the left side of the positive electrode lead 127, a coupling strength of the left side of the positive electrode lead 127 may be stronger than a coupling strength of the right side of the positive electrode lead 127. Since the coupling strength varies in the positive electrode lead 127, the electric resistance between the positive electrode lead 127 and the cap plate 130 is not uniform.

For example, at a location where the coupling strength of the positive electrode lead 127 and the cap plate 130 is relatively weak, a gap may form or the positive electrode lead 127 and the cap plate 130 may not completely contact each other. Accordingly, an area that does not materially provide an electric path may form, and the electric resistance may increase. When the electric resistance of the charge/discharge path of the battery increases, an output performance of the electric resistance deteriorates.

According to embodiments of the present invention, positive electrode lead 127 and the cap plate 130 are coupled at the center of the positive electrode lead 127 so that the coupling strength in the positive electrode lead 127 is uniform. Since the coupling strength between the positive electrode lead 127 and the cap plate 130 is uniform, the positive electrode lead 127 firmly contacts the surface of the cap plate 130, and the electric resistance of the charge/discharge path may be reduced.

The technical principles of embodiments of the present invention may be applied to both of the positive and negative electrode leads 127 and 129. For example, the negative electrode terminal 139, which couples the negative electrode lead 129 and the cap plate 130, may be used to couple the negative electrode lead 129 and the cap plate 130 at the center of the negative electrode lead 129.

Figure 6A:
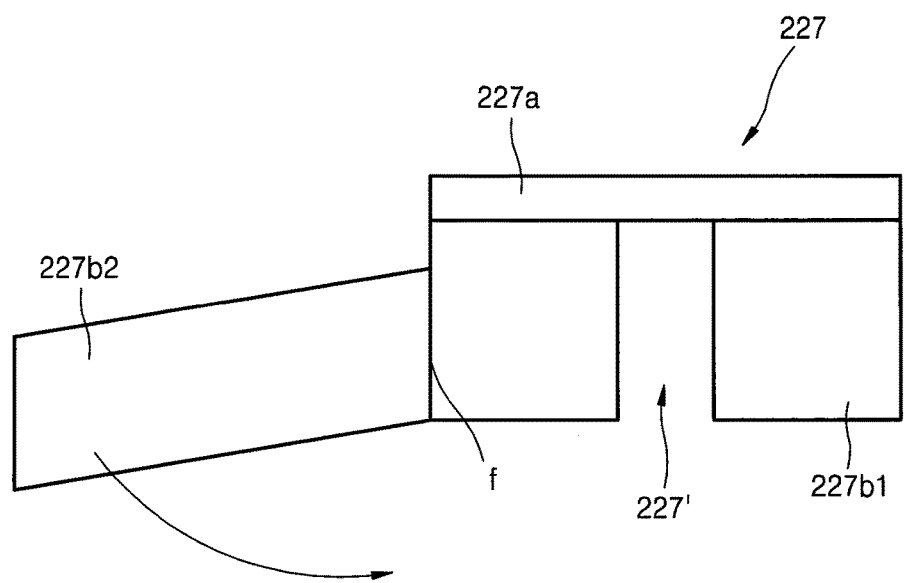
FIGS. 6A to 6C are side views of structures of a positive electrode lead that may be applied to modified embodiments of the present invention.
Figure 6B:
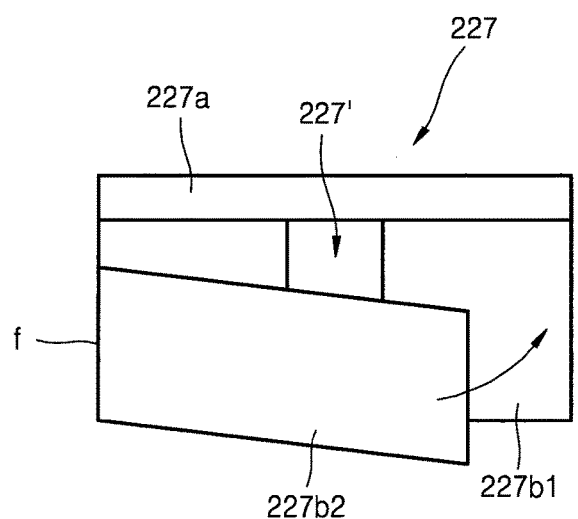
Figure 6C:
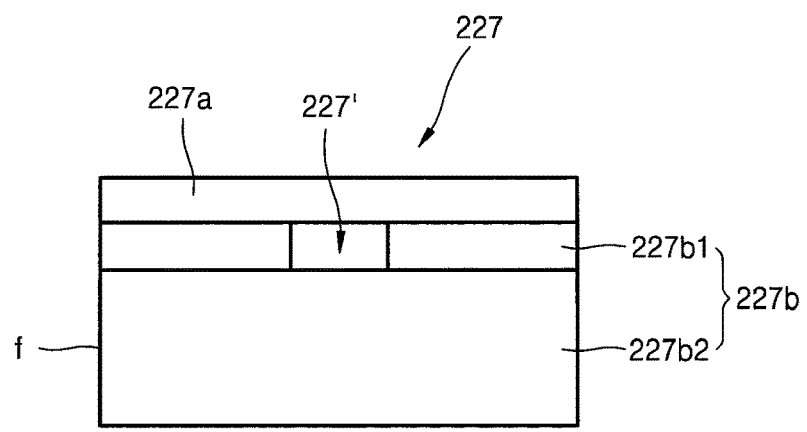

FIGS. 6A to 6C are diagrams of structures of the positive electrode lead 227 that may be applied to other embodiments of the present invention. The positive electrode lead 227 may be partially or entirely formed in two layers. The positive electrode lead 227 may include a first part 227a that is coupled to the cap plate 130, and a second part 227b that is coupled to the positive electrode tab 17. The second part 227b may include two layers. For example, as illustrated in the drawings, the second part 227b of the positive electrode lead 227 may have a two layer structure which includes a first layer 227b1 and a second layer 227b2. The first layer 227b1 contacts the first part 227a and is divided into two parts by an avoidance space 227'. The second layer 227b2 contacts the first layer 227b1 as a full plate. The second layer 227b2 may be folded such that it overlaps the first layer 227b1 around a folded portion f, such that the second part 227b has a two layer structure. The second layer 227b2 may cover a portion of the avoidance space 227' formed in the first layer 227b1. The second layer 227b2 may be narrower than the first layer 227b1 such that at least a portion of the avoidance space 227' (a portion of the avoidance space 227' that is near the first part 227a) is exposed, as illustrated in FIG. 6C.

If the positive electrode lead 227 partially or entirely comprises two layers, a mechanical strength of the positive electrode lead 227 may be increased. An increase in the mechanical strength of the positive electrode lead 227 may restrict movement of the positive electrode lead 227. As shown in FIG. 6C, the second part 227b may be a plate in which the avoidance space 227' is punched as a hole. Although the second part 227b may be two layers, according to other embodiments of the present invention, the second part 227b may be a single layer structure in which the avoidance space 227' is a hole.

Figure 7A:
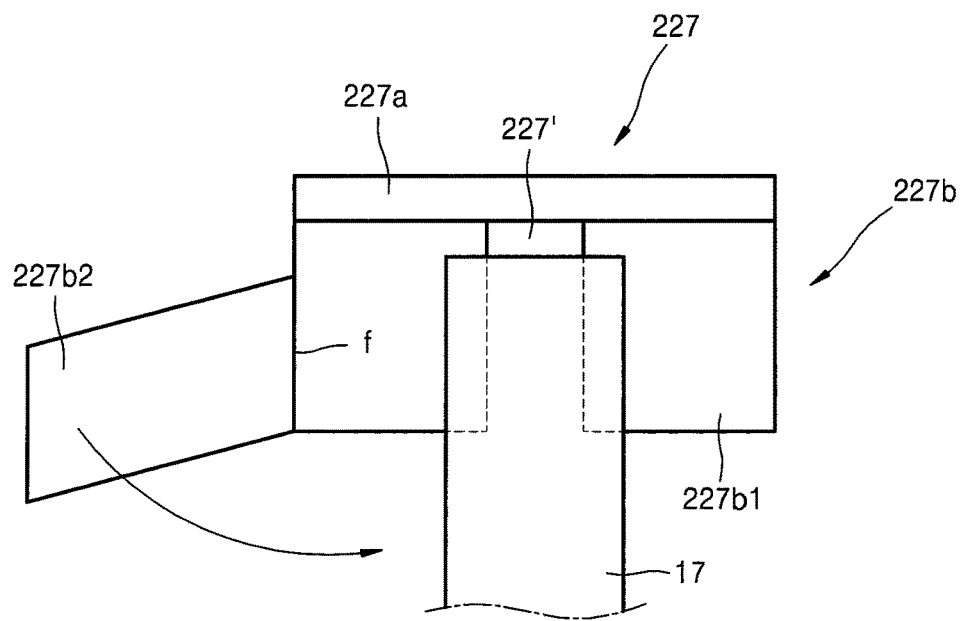
FIGS. 7A and 7B are side views of various structures in which the positive electrode lead of FIGS. 6A to 6C are applied.
Figure 7B:
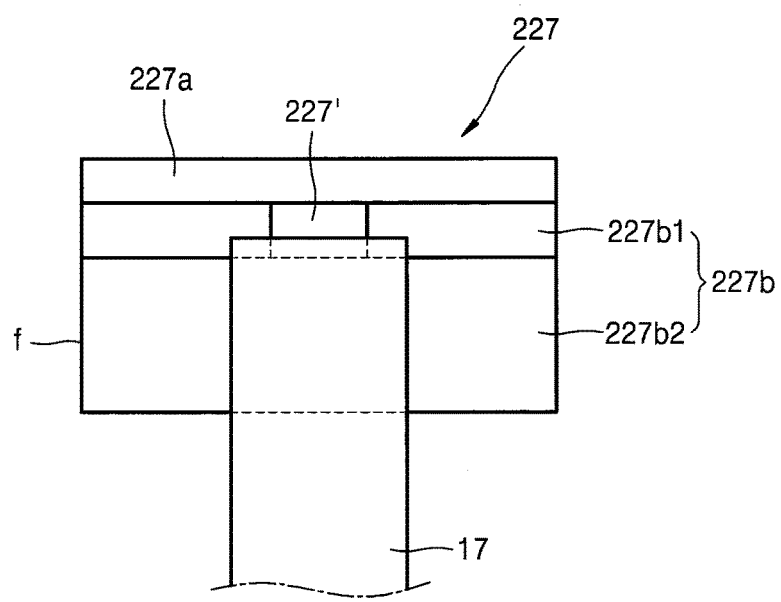

FIGS. 7A and 7B are side views of various structures in which the positive electrode lead 227 of FIGS. 6A and 6B are applied. For example, as illustrated in FIGS. 7A and 7B, the second part 227b of the positive electrode lead 227, which is coupled to the positive electrode tab 17, may be two layers. As illustrated in FIG. 7A, the positive electrode tab 17 may be between the first layer 227b1 and the second layer 227b2. For example, the positive electrode tab 17 overlaps with a portion of the first layer 227b1, and the second layer 227b2 covers the positive electrode tab 17. For example, the first layer 227b1 and the second layer 227b2 may be disposed at the front and back of the positive electrode tab 17, respectively, such that the positive electrode tab 17 is covered, and then electrode lead 227 and the positive electrode tab 17 may be welded together. This may improve welding strength since the positive electrode lead 227, which includes the first and second layers 227b1 and 227b2, covers the positive electrode tab 17.

If the positive electrode tab 17 is directly welded onto the first layer 227b1, the welding strength may be decreased relative to the size of the avoidance space 227'. Therefore, the electrode tab 17 and the second layer 227b2 (that has a more uniform shape and no avoidance space) may be welded.

According to the embodiments illustrated in FIG. 7B, the second layer 227b2 may be disposed on the first layer 227b1, and then, the positive electrode tab 17 may be disposed on the electrode lead 227. For example, a portion of the positive electrode tab 17 may contact the first layer 227b1 and a portion of the positive electrode tab 17 may contact the second layer 227b2 and then welded. Similar to the description above, if the positive electrode tab 17 is directly welded onto the first layer 227, the welding strength may decrease relative to the avoidance space 227'. Therefore, the second layer 227b2 (that has a more uniform shape) and the positive electrode tab 17 may be welded.

Figure 8:
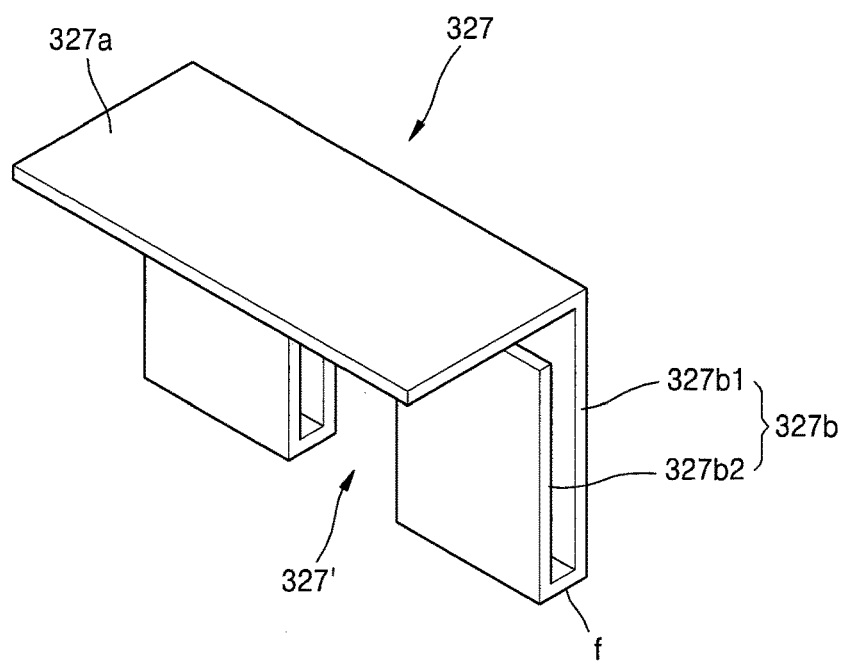
FIG. 8 is a perspective view of a structure of a positive electrode lead according to other embodiments of the present invention.

FIG. 8 is a perspective view of a structure of a positive electrode lead 327 according to other embodiments of the present invention. The positive electrode lead 327 includes a second part 327b that includes two layers and is coupled to the positive electrode tab 17. For example, a first layer 327b1 and a second layer 327b2 of the second part 327b both include an avoidance space 327'. For example, the first and second layers 327b1 and 327b2 are connected to each other and bent with respect to each other around a folded portion f to form two layers of the second part 327b. For example, the second layer 327b2 may be bent around the folded portion f in a generally upward direction, such that an end of 327b2 is near a first part 327a. The second layer 327b2 may be bent upward to contact the first part 327a. For example, the first layer 327b1 and the second layer 327b2 may be folded around the folded portion f and both extend in a generally upward direction such that the first and second layers 327b1 and 327b2 are substantially parallel. This may increase the strength of the folded portion f since the first and second layers 327b1 and 327b2 may both support the first part 327a.

Figure 9:
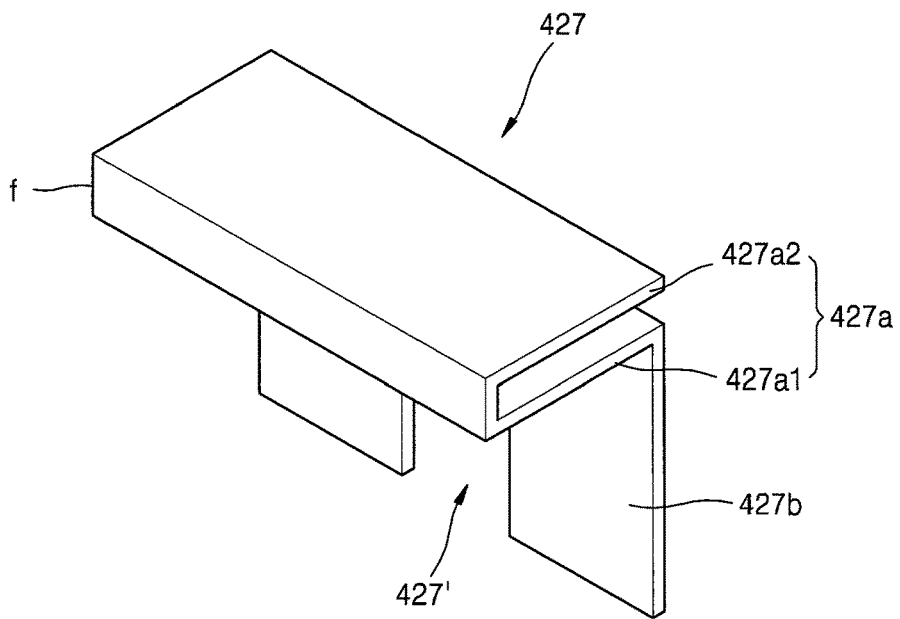
FIG. 9 is a perspective view of a structure of a positive electrode lead according to other embodiments of the present invention.

FIG. 9 is a perspective view of a structure of a positive electrode lead 427 according to other embodiments of the present invention. The positive electrode lead 427 comprises a first part 427a that is coupled to the cap plate 130 and comprises two layers. The first part 427a includes a first layer 427a1 and a second layer 427a2 that may, for example, be bent in a direction toward each other around a folded portion f, such that the first layer 427a1 is substantially parallel to the second layer 427a2.

Figure 10:
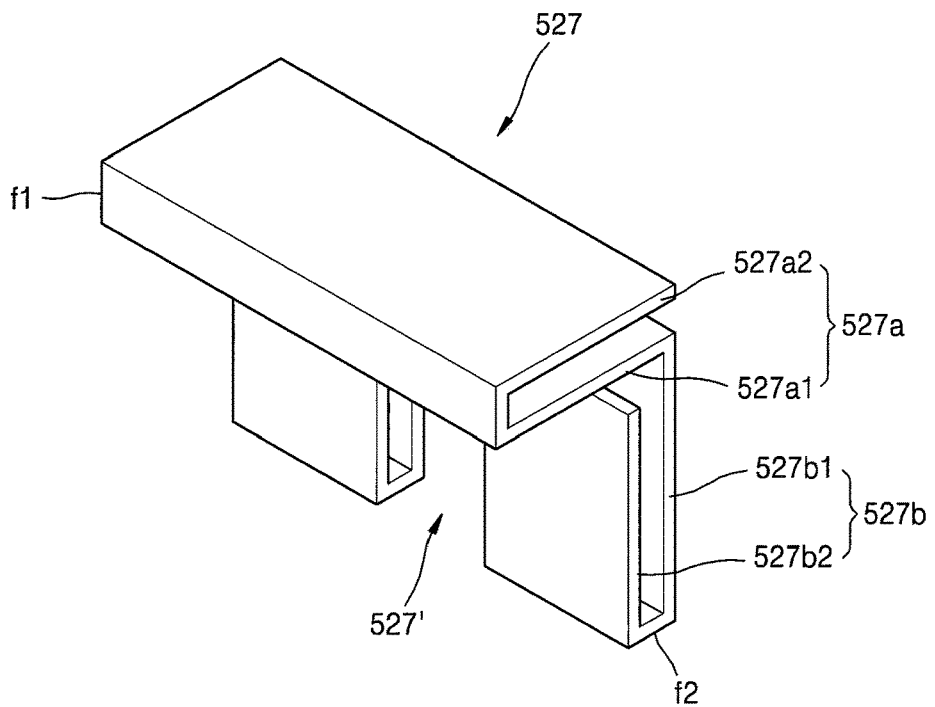
FIG. 10 is a perspective view of a structure of a positive electrode lead according to other embodiments of the present invention.

FIG. 10 is a perspective view of a structure of a positive electrode lead 527 according to other embodiments of the present invention. Referring to FIG. 10, the positive electrode lead 527 includes a first part 527a and a second part 527b each including two layers. For example, the first part 527a comprises a first layer 527a1 and a second layer 527a2 that are substantially parallel to each other around a first folded portion f1, and the second part 527b includes a first layer 527b1 and a second layer 527b2 that are substantially parallel to each other around a second folded portion f2.

Figure 11:
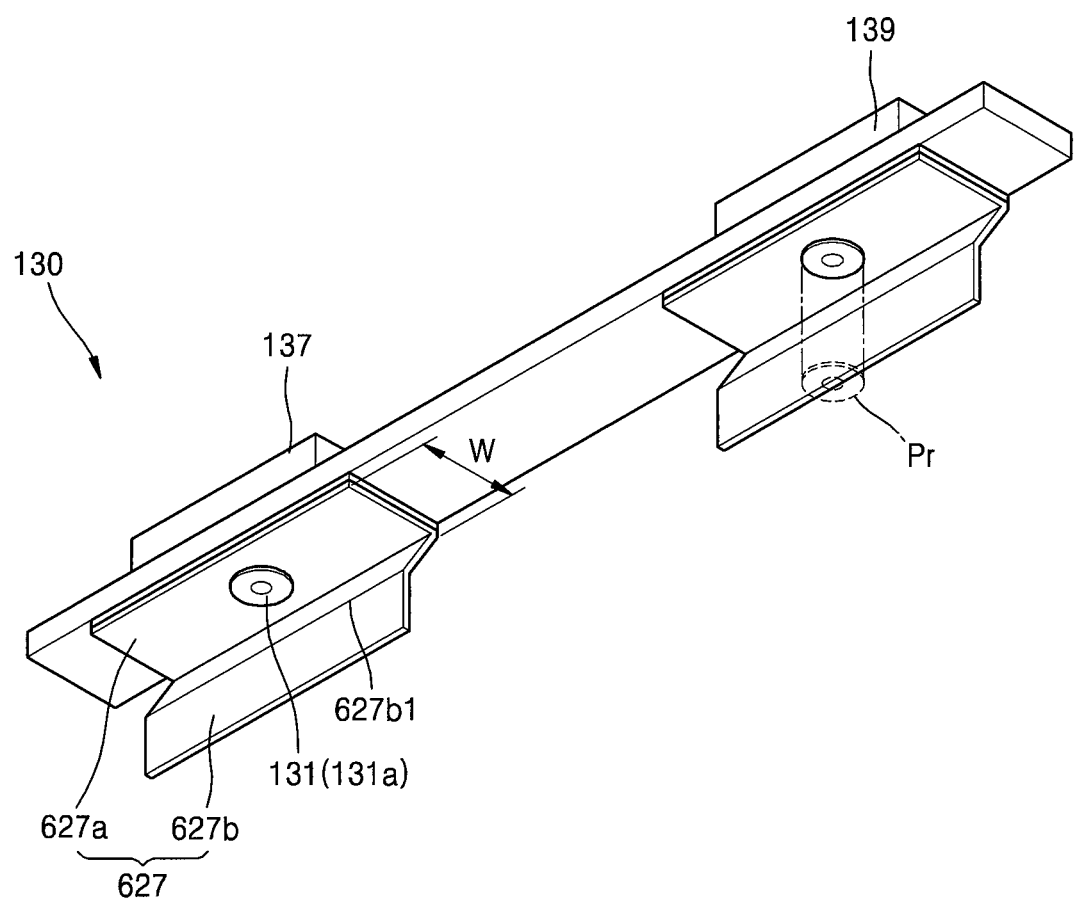
FIG. 11 is a perspective view of a coupling structure of an electrode lead that may be applied to other embodiments of the present invention.

FIG. 11 is a coupling structure of an electrode lead that may be applied to other embodiments of the present invention. Referring to FIG. 11, the coupling pin 131 that protrudes from the cap plate 130 penetrates through an electrode lead 627 and is pressed onto a lower surface of the electrode lead 627. For example, the coupling pin 131 penetrates through the electrode lead 627 and extends through the lower surface of the electrode lead 627. The lower end 131a may be pressed onto the lower surface of the electrode lead 627 by riveting or spinning a lower end 131a of the coupling pin 131 that is exposed through the lower surface of the electrode lead 627.

The electrode lead 627 may include a first part 627a that is coupled to the cap plate 130, and a second part 627b that bends from the first part 627a and extends downward. A portion of the lower end 131a may overlap with the second part 627b. For example, as illustrated in FIG. 11, a portion Pr of the lower end 131a which extends (or projects) downward may overlap the second part 627b.

The lower end 131a may be coupled to the center of the first part 627a in a width direction W. Also, the second part 627b of the electrode lead 627 may extend generally downward from the face of the first part 627a. Since the second part 627b of the electrode lead 627 is connected to an electrode tab of an electrode assembly, the second part 627b may be inclined toward the center of the electrode assembly, i.e., the center of the first part 627a in the width direction W.

In embodiments of the present invention, a portion of the lower end 131a (located at the center of the first part 627a of the electrode lead 627) may overlap the second part 627b. For example, the portion Pr of the lower end 131a which extends (or projects) downward may overlap the second part 627b of the electrode lead 627.

As shown in FIG. 11, the second part 627b of the electrode lead 627 may extend downward while inclining toward the center of the first part 627a from the front or the back of the first part 627a. For example, a bent portion 627b1 may be formed in the second part 627b, such that the second part 627b may extend toward the center of the first part 627a.

Figure 12A:
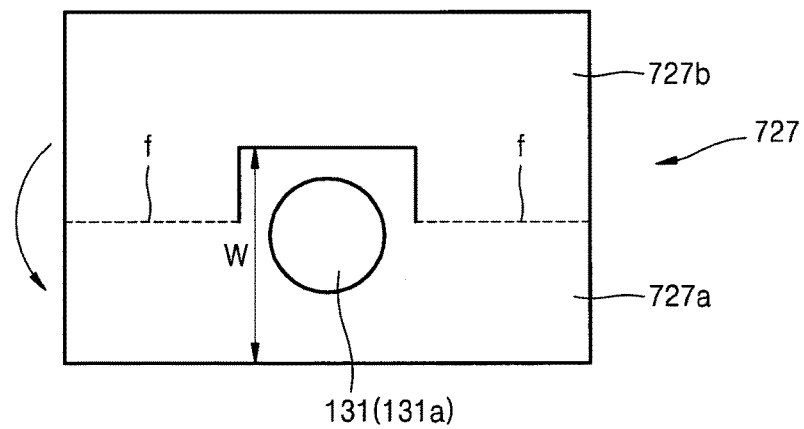
FIGS. 12A and 12B are top views of a structure of an electrode lead that may be applied to other embodiments of the present invention.
Figure 12B:
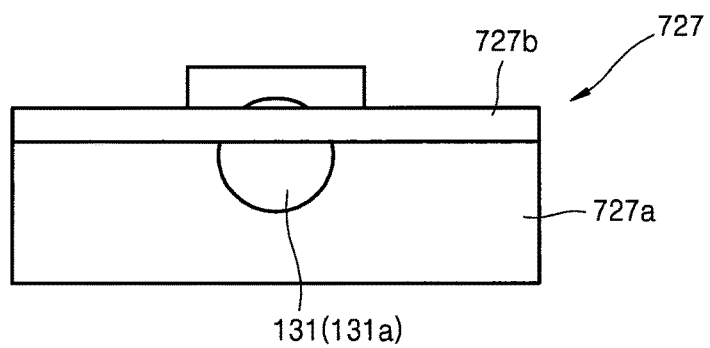

FIGS. 12A and 12B are top views of a structure of an electrode lead 727 that may be applied to other embodiments of the present invention. Referring to FIGS. 12A and 12B, the electrode lead 727 includes a first part 727a that is coupled to a cap plate, and a second part 727b that extends from the first part 727a to an electrode tab of an electrode assembly.

The first and second parts 727a and 727b of the electrode lead 727 are bent with respect to each other along two folded portions f. In some embodiments, the first part 727a may expand between the folded portions f that are spaced apart.

The coupling pin 131, which is connected to the cap plate, is formed in the first part 727a. Since the lower end 131a of the coupling pin 131 is pressed at a coupling location of the coupling pin 131, the coupling pin 131 may be formed over a large area to improve coupling strength. Also, the second part 727b coupled to the electrode assembly (for example, coupled to the electrode tab) may be formed at the center of the electrode assembly (i.e., at the center of the first part 727a in a width direction W) to improve coupling strength with the electrode assembly.

As a result, at the coupling location of the coupling pin 131, a portion of the first part 727*a* between the folded portions f expands such that an area of the first part 727*a* that is coupled to the cap plate increases in size. Also, the folded portions f, which form a boundary between the first and second parts 727*a* and 727*b,* may be formed as close to the center as possible along the width direction W of the first part 727*a*. In embodiments illustrated in FIGS. 12A and 12B, the second part 727*b* may be a plate.

Figure 13:
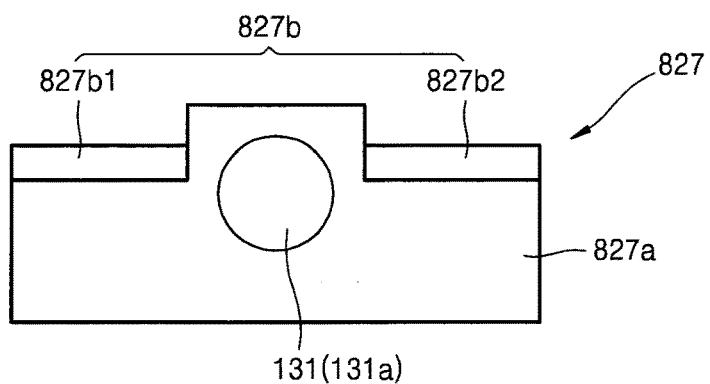
FIG. 13 is a top view of a structure of an electrode lead that may be applied to other embodiments of the present invention.

FIG. 13 is a top view of an electrode lead 827 that may be applied to other embodiments of the present invention. Referring to FIG. 13, the electrode lead 827 includes a first part 827*a* coupled to a cap plate, and a second part 827*b* that extends from the first part 827*a* toward an electrode tab of an electrode assembly. According to embodiments of the present invention, the second part 827*b* may be divided into two parts 827*b*1 and 827*b*2. The electrode lead 827 may provide an avoidance space for avoiding interference with the coupling pin 131 that couples the electrode lead 827 with the cap plate.

Figure 14:
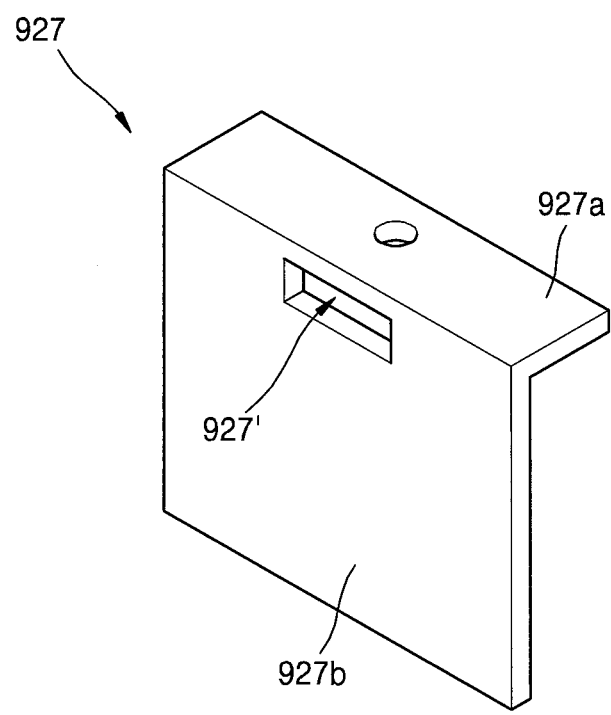
FIG. 14 is a perspective view of a structure of an electrode lead that may be applied to other embodiments of the present invention.

FIG. 14 is a perspective view of a structure of an electrode lead 927 that may be applied to other embodiments of the present invention. Referring to FIG. 14, the electrode lead 927 includes a first part 927*a* coupled to the cap plate, and a second part 927*b* that extends from the first part 927*a* to an electrode tab of an electrode assembly. The electrode lead 927 may provide an avoidance space 927' for avoiding interference with the coupling pin 131 that couples the electrode lead 927 with the cap plate. For example, the second part 927*b* may be a plate with the avoidance space 927' punched as a hole.

According to embodiments of the present invention, a cap plate and a lead may be coupled at the center of the lead to provide a uniform coupling strength across the entire coupling surface of the lead and to prevent partial gaps and incomplete contact due to weak coupling strength between the cap plate and the lead. This may reduce an electric resistance of a charge/discharge path and improve output performance of a battery.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A battery comprising:
   an electrode assembly;
   a cap plate comprising an electrode terminal and a coupling pin, the coupling pin protruding from a lower surface of the cap plate, and the cap plate having a length and a width, the length being greater than the width; and
   an electrode lead having an opening and being coupled to the cap plate by coupling the electrode lead to the coupling pin, wherein the electrode lead electrically connects the electrode assembly and the electrode terminal,
   wherein the cap plate and the electrode lead are directly connected to each other at a center of the electrode lead such that a distance from a first end of the electrode lead to the coupling pin is equal to a distance from a second end of the electrode lead to the coupling pin, the first end being opposite to the second end along the length of the cap plate, and
   wherein the coupling pin extends through the opening.

2. The battery of claim 1,
   wherein an end of the coupling pin that is exposed through the electrode lead has been riveted or spun to be pressed onto the electrode lead.

3. The battery of the claim 1, wherein the electrode lead comprises:
   a first part that faces and is coupled to the cap plate; and
   a second part that bends from the first part and faces and is coupled to an electrode tab that projects from the electrode assembly.

4. The battery of claim 3, wherein an avoidance space is formed in the second part of the electrode lead.

5. The battery of claim 4, wherein the second part of the electrode lead is divided into two parts by the avoidance space.

6. The battery of claim 4, wherein the second part of the electrode lead is formed as a plate in which the avoidance space is punched as a hole.

7. The battery of claim 3, wherein the second part of the electrode lead comprises a first layer and a second layer, and
   wherein the electrode tab is between the first and second layers.

8. The battery of claim 3, wherein the second part of the electrode lead comprises a first layer and a second layer, and
   wherein the electrode tab is on the first and second layers.

9. The battery of claim 3, wherein the second part of the electrode lead comprises a first layer and a second layer,
   wherein the first layer is divided into two parts to provide an avoidance space,
   wherein the second layer comprises a plate, and
   wherein the second layer covers a portion of the avoidance space of the first part.

10. The battery of claim 3, wherein the second part of the electrode lead comprises a first layer and a second layer, and
    wherein the first and second layers are divided into two parts to form an avoidance space.

11. The battery of claim 3, wherein the first part of the electrode lead comprises a first layer and a second layer.

12. The battery of claim 1, wherein the electrode lead partially or entirely comprises two layers.

13. The battery of claim 1,
    wherein a lower end of the coupling pin, which is exposed through the electrode lead, has been riveted or spun to be pressed onto the electrode lead, and
    wherein an extended portion of the lower end of the coupling pin partially overlaps the electrode lead.

14. The battery of claim 13, wherein the electrode lead comprises a first part coupled to the cap plate, and a second part that extends from the first part to the electrode assembly, and
    wherein the second part of the electrode lead partially overlaps the extended portion of the lower end of the coupling pin.

15. The battery of claim 1, wherein the electrode lead comprises a first part coupled to the cap plate, a second part that extends from the first part to the electrode assembly, and folded portions that connect the first and second parts such that the first and second parts and bent with respect to each other, and
    wherein the first part expands between two folded portions that are spaced apart.

16. The battery of claim 15, wherein a coupling pin, which protrudes via the electrode lead, is coupled to an expanded portion of the first part.

17. The battery of claim 1, wherein the coupling pin is offset from the electrode terminal along the length of the cap plate.

18. The battery of claim 3, wherein the second part comprises a first plate portion and a second plate portion extending from the first part and having an avoidance space defined therebetween.

* * * * *